(12) United States Patent
Forbes et al.

(10) Patent No.: US 7,751,340 B2
(45) Date of Patent: Jul. 6, 2010

(54) MANAGEMENT OF INCOMING INFORMATION

(75) Inventors: Scott C. Forbes, Redmond, WA (US); Alexander Frank, Bellevue, WA (US); Shai Guday, Redmond, WA (US); Miller Thomas Abel, Mercer Island, WA (US); Johannes Klein, Sammamish, WA (US); William Jefferson Westerinen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 688 days.

(21) Appl. No.: 11/556,605

(22) Filed: Nov. 3, 2006

(65) Prior Publication Data

US 2008/0107037 A1   May 8, 2008

(51) Int. Cl.
*H04L 12/56* (2006.01)
*H04J 3/22* (2006.01)

(52) U.S. Cl. .................... 370/252; 370/465
(58) Field of Classification Search ................ 370/230, 370/230.1, 242, 252; 709/203, 224–226; 714/1, 18, 44, 49, 50
See application file for complete search history.

(56) References Cited

U.S. PATENT DOCUMENTS

| | | | |
|---|---|---|---|
| 6,038,450 A * | 3/2000 | Brink et al. | 455/442 |
| 6,282,173 B1 * | 8/2001 | Isonuma et al. | 370/242 |
| 6,338,713 B1 | 1/2002 | Chamoun et al. | |
| 6,513,060 B1 * | 1/2003 | Nixon et al. | 709/203 |
| 6,607,480 B1 | 8/2003 | Bousseljot et al. | |
| 6,763,322 B2 | 7/2004 | Potyrailo | |
| 7,006,856 B2 | 2/2006 | Baker et al. | |
| 7,065,465 B2 | 6/2006 | Chen et al. | |
| 7,325,055 B2 * | 1/2008 | Fukunari et al. | 709/224 |
| 2002/0042812 A1 * | 4/2002 | Spencer | 709/203 |
| 2003/0151513 A1 * | 8/2003 | Herrmann et al. | 340/573.1 |
| 2003/0191695 A1 | 10/2003 | Kondo et al. | |
| 2003/0216143 A1 | 11/2003 | Roese et al. | |
| 2005/0080596 A1 | 4/2005 | Duckert et al. | |
| 2006/0002368 A1 * | 1/2006 | Budampati et al. | 370/351 |
| 2006/0028996 A1 * | 2/2006 | Huegen et al. | 370/252 |
| 2006/0083180 A1 * | 4/2006 | Baba et al. | 370/252 |
| 2006/0097862 A1 | 5/2006 | McKitterick et al. | |
| 2006/0126901 A1 | 6/2006 | Mattes et al. | |

(Continued)

FOREIGN PATENT DOCUMENTS

WO    PCT/JP2005/000408    *    1/2005

OTHER PUBLICATIONS

Michael J. Covington et al "Parameterized Authentication", ESORICS 2004: European symposium on research in computer security N°9, 2004.

(Continued)

*Primary Examiner*—Chi H Pham
*Assistant Examiner*—Warner Wong
(74) *Attorney, Agent, or Firm*—Collins & Collins Incorporated; L. Alan Collins

(57) ABSTRACT

A method and system is provided for determining reliability of data from a network or federated device. In one example, data from different devices in the network are compared and a relationship between the devices is determined. The reliability may be based on the relationship of the devices and/or similarity of data from the devices. In another example, reliability of devices and/or data from the devices may be based on a historical reliability of the devices.

16 Claims, 6 Drawing Sheets

U.S. PATENT DOCUMENTS

| | | | | |
|---|---|---|---|---|
| 2007/0055766 | A1* | 3/2007 | Petropoulakis et al. | 709/224 |
| 2007/0115905 | A1* | 5/2007 | Jokela et al. | 370/338 |
| 2007/0286071 | A1* | 12/2007 | Cormode et al. | 370/229 |
| 2008/0232265 | A1* | 9/2008 | Kakiuchi | 370/252 |

OTHER PUBLICATIONS

Jan Lukas et al. "Determining Digital Image Origin Using Sensor Imperfections", Image and video communications and processing, 2005.

Gang Wu et al "Multi-camera Spatio-temporal Fusion and Biased Sequence-data Learning for Security Surveillance", Proceedings of the eleventh ACM international conference on Multimedia, 2003, pp. 528-538.

Yingqi Xu "Energy-Aware Object Tracking Sensor Networks". In Proc ICDCS Doctoral Symposium, Providence, RI, May 2003.

John S. Baras et al. "Managing Trust in Self-organized Mobile Ad Hoc Networks", 12th Annual Network and Distributed System Security Symposium (NDSS) workshop. Feb. 2005.

Jack Stankovic "Adaptive Real-Time Scheduling and Control", Department of Computer Science, University of Virginia. Dec. 2002.

Zhaoyu Liu et al. "A Dynamic Trust Model for Mobile Ad Hoc Networks", 10th IEEE International Workshop on Future Trends of Distributed Computing Systems. 2004.

Samir Goel et al "Prediction based Monitoring in Sensor Networks Taking Lessons from MPEG", ACM SIGCOMM Computer Communication Review, Oct. 2001, vol. 31, Issue 5.

* cited by examiner

| R | Reliability status |
|---|---|
| 0 | Unreliable |
| 1 | Low Marginal |
| 2 | Med Marginal |
| 3 | High Marginal |
| 4 | Low Avg |
| 5 | Med Avg |
| 6 | Hi Avg |
| 7 | Low High |
| 8 | Med High |
| 9 | Hi High |

| | Device A | Device B | Device C | Device D | Device E |
|---|---|---|---|---|---|
| Manufacturer | Ajax | Sensit | Ajax | Aoki | Panaview |
| Model | Imager 2000 | XMT-2 | Imager 3000 | TXX-445 | P-Supreme |
| Location | 57° 15' | 60° 15' | 57° 18' | 60° 20' | 61° 20' |
| Vendor | Joe's E-Hut | Electronic supplies | Joe's E-Hut | E-World | Bert's Cameras |
| Related devices | Ajax Imager 3000<br>Ajax Imager 4000<br>Ajax Imager 5000<br>Acme 4500<br>Acme 5500<br>Acme 5600 | Blue Spot 4000<br>Blue Spot 5000<br>TomRow XT | Ajax Imager 2000<br>Ajax Imager 4000<br>Ajax Imager 5000<br>Acme 4500<br>Acme 5500<br>Acme 5600 | S-Wind MR-6<br>S-Wind MR-8<br>Dayo 100 | TRI 44<br>TRI 45 |
| Related Users | Device C | Device Q | Device A | Device X | Device Y<br>Device Z |

FIG. 7

MANAGEMENT OF INCOMING INFORMATION

BACKGROUND

Devices in a federated network may be used to obtain information of an object or environment. For example, the devices in the federated network may include sensor devices that enter or leave the network as desired and sense the environment and return information on the environment to a user. In this way, the topology of the network is fluid with connections being made, terminated or modified as different needs arise.

New devices may enter a pre-existing network. These new devices may enter the network and provide data to the user depending on a user's needs. Also, the new device may receive data from any other device or entity in the network. In many cases, the new device that enters the network provides accurate information for the user. However, in many other cases, the information from a new device is not known to be reliable. If erroneous information is received from the device, then the user receives the erroneous information and the user may make decisions based on the erroneous information. This results in frustration for the user.

At the same time, if a user receives information from a device in a network and assumes incorrectly that the information received is unreliable and discounts it, then if the information is actually trustworthy, the user may disregard valid data. This may cause further delays in processing of the information and additional frustration for the user.

Therefore, there is a need to determine the trustworthiness of data received from a data source or a plurality of data sources.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a method of measuring reliability of data from a data source such as a federated device in a network is described. For example, data received from one device may be compared to data received from another device in the network. Reliability may be determined based on the comparison of data.

In another example, a relationship is determined between devices and reliability may be based on the relationship of the devices and/or a comparison of data from the respective devices.

In yet another example, reliability may be determined based on historical reliability of the devices.

Also, a system is described for determining reliability of data received from a device in a network.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 7 illustrates an example of device relationships in determining reliability.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
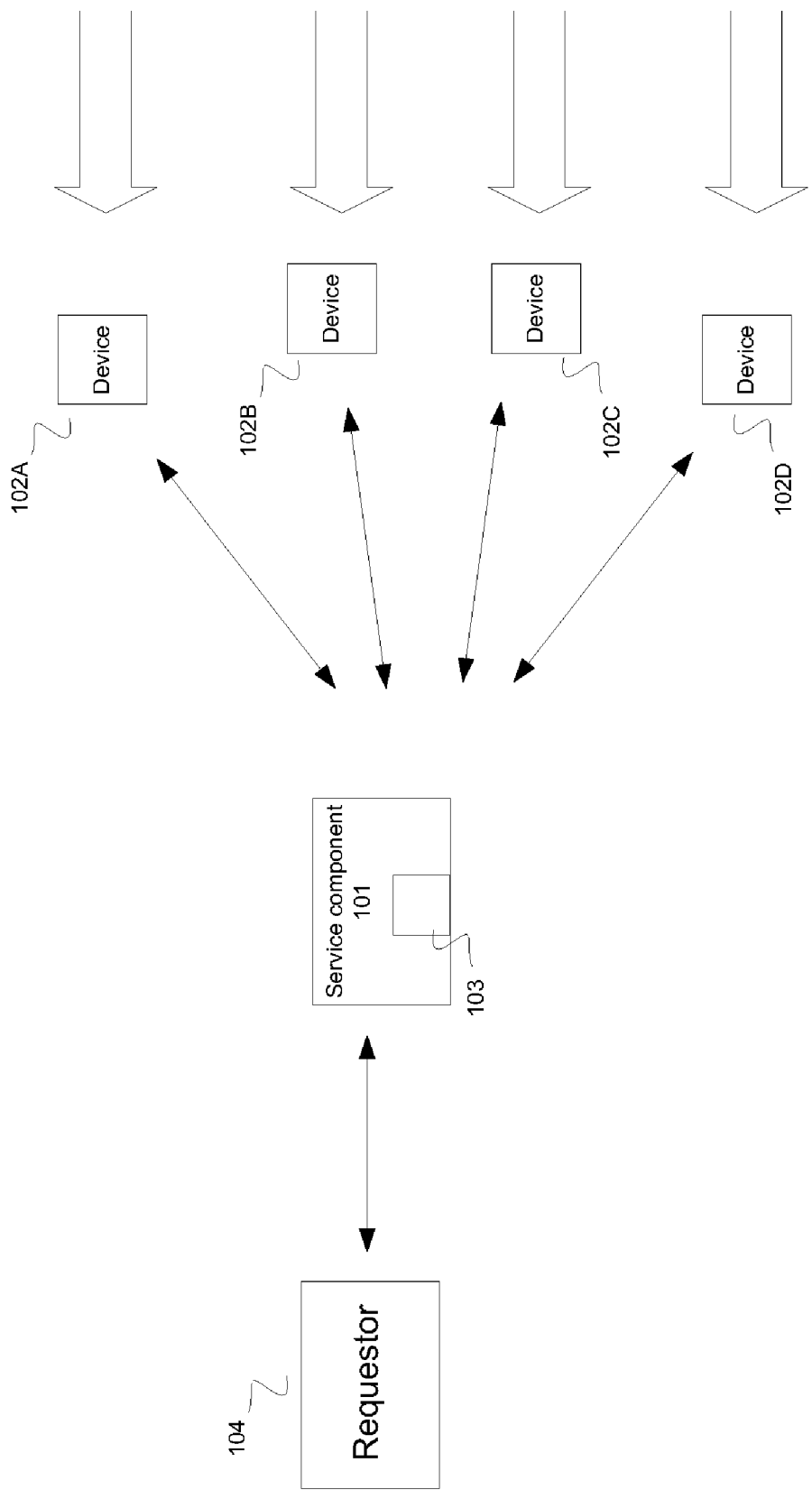
FIG. 1 is a partial block diagram illustrating a network of federated devices.

A method and system for determining reliability of information in a network of federated devices is described. FIG. 1 is a partial block diagram illustrating an example of a network of federated devices in a sensor network. A service component 101 may communicate with any of the devices in the network. As illustrated in FIG. 1, a network may include device 102A, 102B, 102C and 102D. Although FIG. 1 illustrates four devices in the federated network, any number of devices may be included in the network and any of the devices may transmit data to the service component 101. In addition, the service component 101 may also be a client device in the network.

In one example, the devices 102A, 102B, 102C or 102D are camera sensors which transmit images of an environment to the service component 101. The service component 101 may be a hub or backend processor that receives the image information from the camera sensors. Based on the received images at the service component 101, an object or entity of interest may be detected. The service component may further deliver information received from the federated devices in the network to a user or requestor 104. For example, a requestor 104 may request certain data or images via the service component 101. The service component 101 requests data from selected federated devices to obtain the data requested by the requestor 104. The federated devices in the network capture the requested data and return the requested data to the service component 101, which sends the requested data to the requestor 104.

In many cases, a requestor may wish to receive reliable information. If data received from at least one of the federated devices in the network is unreliable or erroneous, then the erroneous information may be passed on to the requestor which could prove detrimental to the requestor. Thus, in another example, the service component 101 may contain a data reliability component 103 for determining the reliability of the information received from the federated devices (e.g., devices 102A, 102B, 102C, 102D). Alternatively, the data reliability component 103 may be separate from the service component 101. For example, data from the federated devices may be delivered to a data reliability component 103 that determines the reliability of the received data. Based on the determination of reliability at the data reliability component 103, the data may be further processed accordingly at the service component 101, if desired, and sent to the requestor. In another example, the data reliability component 103 may return the data directly to the requester.

The data reliability component 103 may receive information from the federated devices in the network and may determine a reliability factor for the data received. The reliability factor may provide an indication of an expected or estimated level of reliability of the received data and/or the device that provided the data. Thus, when data is received from an unreliable data source, the reliability factor determined by the data reliability component 103 may reflect the level of reliability of the data source.

In one example, a requestor 104 submits a request to the service component 101 for image data of a certain locale. The service component 101 determines devices in a federated network for providing the requested data. This determination may be based on a variety of factors such as, but not limited to, location of the devices, characteristics of the devices, or capabilities of the devices. The service component 101 sends a request to selected devices for providing the requested data. Optionally, the service component 101 may also send additional instructions to the selected devices for providing the requested data. Additional instructions may include, but are not limited to, instructions regarding which way to orient the device or distance/direction of moving the device to obtain the requested data.

The selected devices in the network capture the desired data and return the data to the service component 101. Some of the data received from the devices may be accurate whereas some of the other data received from the devices may be erroneous. The erroneous data may even include data from a malicious data source such that the erroneous data may be intended to disrupt services to the service component or the requester. In this example, the service component 101 includes a data reliability component 103. The data reliability component 103 determines the reliability of the data based on the data source which provided the data or the data received. If data is received by the service component 101 from an unreliable data source, the data reliability component 103 assigns a corresponding reliability factor to the data and the data source. Conversely, if the data is received by a reliable data source, the data reliability component 103 assigns a reliability factor with a value reflecting the reliable nature of the data source and the data received from the reliable data source. In one example, the higher the value of the reliability factor, the more reliable the data source and the data received is estimated to be. In another example, a lower value of the reliability factor indicates increased estimated reliability. Any predetermined scheme may be used to indicate reliability of a device or data using corresponding reliability factors.

Data identified as likely to be unreliable may be processed accordingly at the service component 101. For example, the service component 101 may discard the data, send a message to the requestor indicating that the data is likely to be unreliable, send the data to the requestor with an indication of the unreliable nature of the data, etc. Thus, the requestor may receive data that is likely to be reliable or may receive data with a determination of the level of reliability of the data received.

Figure 2:
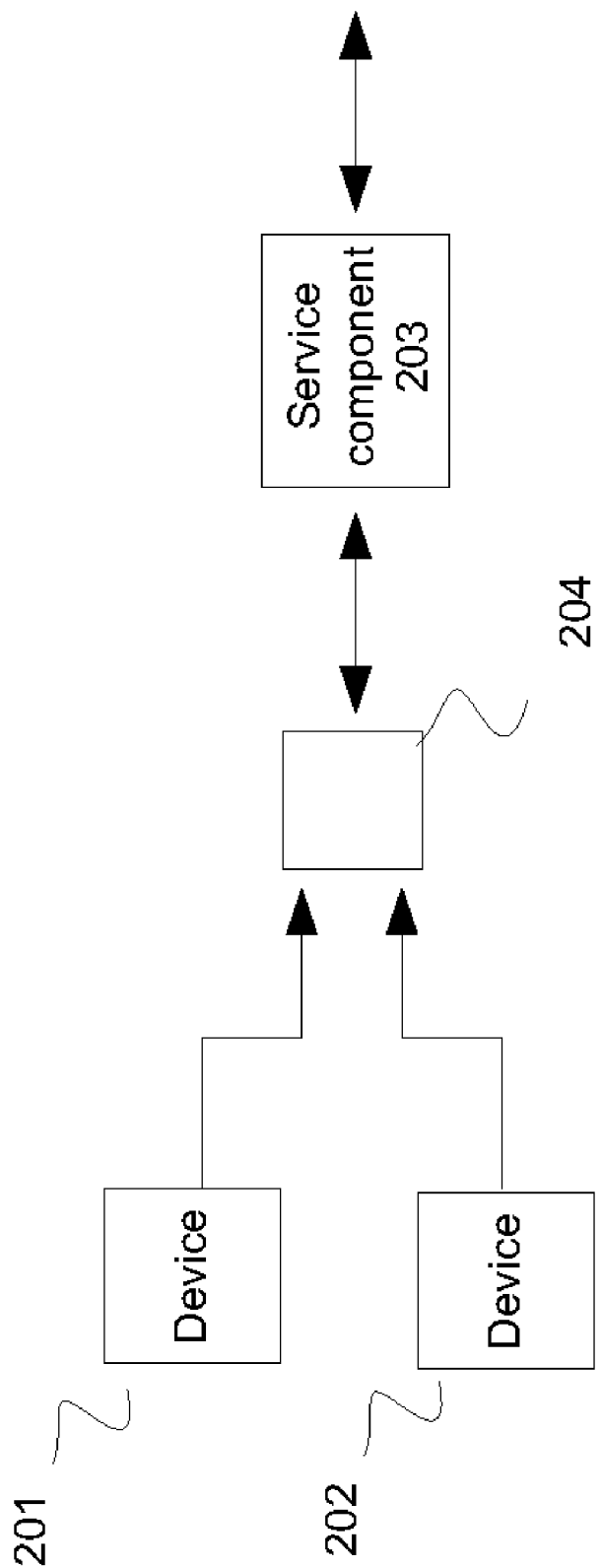
FIG. 2 is a partial block diagram illustrating an example of a federated network.

FIG. 2 is a partial block diagram illustrating an example of a federated network. In this example, device 201 and device 202 communicate data to a data reliability component 204. Although FIG. 2 illustrates two devices in the network, any number of devices may be included in the network. Each of the devices 201, 202 may exchange with the data reliability component 204. Also, any device of known or unknown reliability may join the network. The likelihood that the data returned by a device is reliable may therefore be known.

The data returned from the devices is received at a data reliability component 204. The data reliability component 204 calculates a reliability factor that indicates the level of reliability of a corresponding device. Based on the calculated reliability factor for each of the devices, the data may be transmitted to the service component 203 for delivery to a user or requestor or alternately handled. In this example, the data reliability component 204 is separate from the service component 203. Alternatively, the data reliability component 204 may be incorporated in the service component 203.

Figures 3, 4:
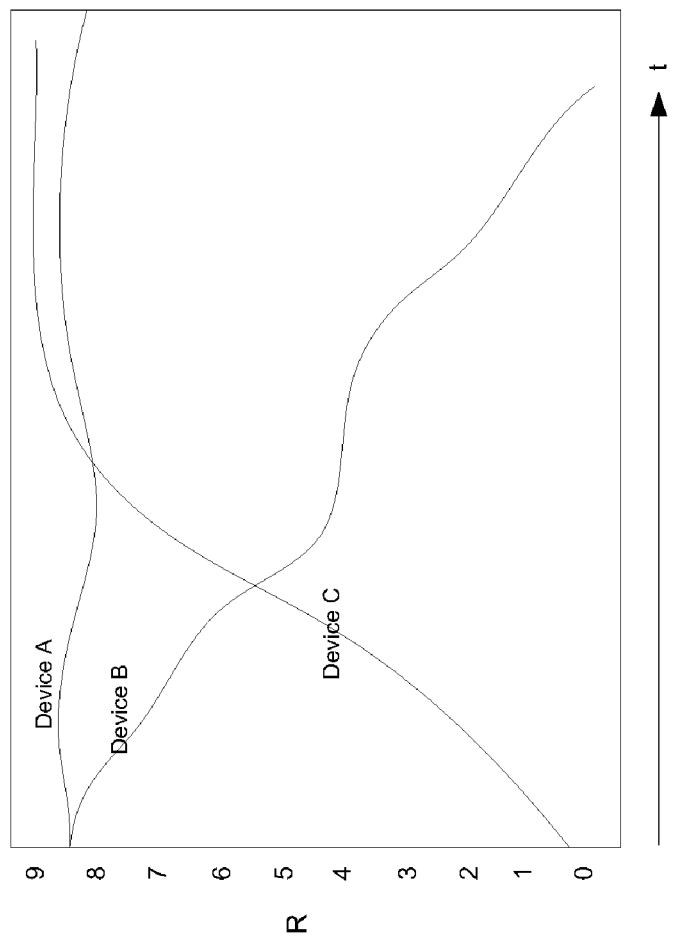
FIG. 3 illustrates an example of reliability factors (R) assigned to devices or data from the devices.
FIG. 4 is a graph indicating an example of reliabilities of multiple devices in a federated network.

FIG. 3 illustrates an example of reliability factors (R) assigned to devices or data from the devices. The reliability factor (R) in this example ranges from 0 to 9 in which R=0 indicates unreliable data, R=1 to 3 indicates marginally reliable data, R=4 to 6 indicates data of average reliability, and R=7 to 9 indicates data with a high level of reliability. The data reliability component 204 of FIG. 2 may determine the reliability level of incoming data and the corresponding devices and may assign a reliability factor to the data/device. Based on the identified value of the reliability factor, the data reliability component 204 and the service component 203 may direct the data accordingly. FIG. 3 is merely an example as the reliability factors may have any values for indicating reliability of data received from a network.

FIG. 4 is a graph indicating an example of reliabilities of multiple devices in a federated network. In this example, each of devices A-C have corresponding reliability factor values that change over time t for indicating the respective reliabilities of each of the devices. Device A in this example has an initial reliability factor of approximately 9 which indicates that device A has a high reliability rating in this example. However, the reliability of a device may change over time. For example, a device may provide accurate information over time such that the reliability factor of the device may increase or remain substantially constant. Conversely, a device may provide inaccurate information over time such that the reliability factor of the device may decrease over time.

In this example, device A maintains substantially the same reliability factor value over time t. However, the reliability factor value of device B, which has a value of approximately 9, decreases over time t to a value of 0. Hence, after time t, device B is determined to be unreliable. The data received from device B may be processed accordingly (e.g., ignored, discarded or provided with an indication of the unreliable nature of the data). Device C in this example has an initial reliability factor value of 0 indicating that data from device C is unreliable. However, after time t, the reliability factor value of device C increases to 9 indicating that data received from device C has high reliability after time t.

Figure 5:
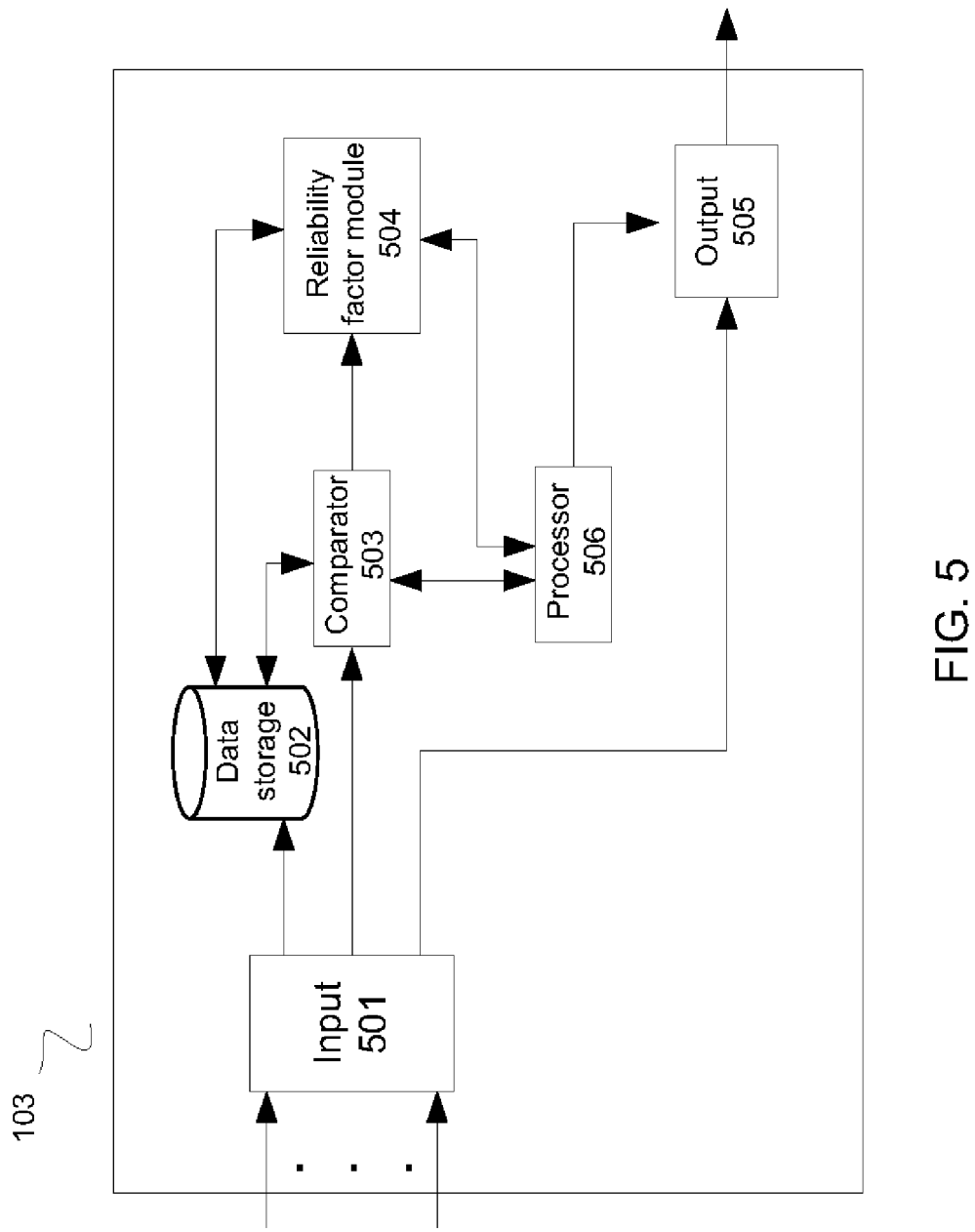
FIG. 5 is a partial block diagram illustrating an example of a component for determining data reliability.

FIG. 5 is a partial block diagram illustrating an example of a component for determining data reliability, such as the data reliability component 103 illustrated in FIG. 1. As FIG. 5 illustrates, the data reliability component 103 may include an input 501 for receiving data from a remote device. The input 501 may receive input from any number of devices in a network. The information received at the input 501 may include, for example, image data captured by the devices in the network, audio data, vibration data, temperature data, pressure data, etc. Also, the information received at the input 501 may include characteristics, qualities or capabilities of the devices in the network. Such information may include, but is not limited to, device identifiers, corresponding user information, location, model name or number, vendor information, relative distances, etc.

Any of the information received at input 501 may be stored in data storage 502. For example, characteristics, qualities, or capabilities of the devices in the network may be received via input 501 and stored in data storage 502. Also, information corresponding to a device in the network may be received at the input 501 and compared via a comparator 503 with information in the data storage 502. For example, information corresponding to a first device may be received via input 501 and stored in data storage 502. Information corresponding to a second device in the network may be subsequently received via input 501 and compared by the comparator 503 with corresponding information of the first device retrieved from the data storage 502. A processor 506 may also be used to control the comparison of the received input information with stored information in the data storage 502.

The comparator 502 may be controlled by a processor 506. Alternatively, the processor 506 may be incorporated within the comparator 503 or may be separate from the reliability module or service component. In this example, the processor 506 controls the comparator 503 in comparing information corresponding to one device in a network with information corresponding to another device in the network. Based on the comparison and the detection of similarities or differences between the two devices in the network, the processor 506 may instruct the comparator 503 to output comparison data to a reliability factor module 504. The reliability factor module 504 may also be controlled by the processor 506 and may determine a reliability factor based on comparison information from the comparator 503.

The reliability factor module 504 sends the reliability factor corresponding to the network device to the processor 506 and/or may store the reliability factor in data storage 502 associated with a corresponding device. This information may be accessed at a subsequent time if needed. For example, the reliability factor module 504 may access the data storage 502 to determine the past history of a device with regard to previous reliability factor values for the device. The past history of reliability of a device may be provided in a reliability history record. The current reliability factor determination by the reliability factor module 504 may be based, at least in part, on previous or historical values of the reliability factor for the device or the reliability history record. In one example, a device may have had high reliability factor values that exceed a predetermined value. In this case, the reliability factor module 504 may determine a high reliability factor for the device (i.e., indicating high reliability of the device in this example).

The reliability factor module 504 may also access the data storage 502 to retrieve user information corresponding to a network device. The reliability factor determined by the reliability factor module 504 may therefore also be based, at least in part, on the user of the device in view of the data received. For example, if the data received pertains to subject matter of which the identified user is known to be knowledgeable, then the reliability factor module 504 may assign a higher reliability factor to the data to indicate a higher likelihood that the data is reliable.

The processor 506, based on the reliability factor received from the reliability factor module 504, controls the output 505 to provide the data received via the input 501 from the corresponding device in the network. In an example to illustrate, a network device provides captured data to the input 501 and also provides device information (e.g., device identifier, user identifier, buddy lists of corresponding user, etc.). Similarly, captured data and device information may be received from other devices in the network. If captured data received from a first network device is in accordance with captured data received from a second network device, the first and second network device may be compared by the comparator 503. The comparison may be performed between the data received via the input 501 or from data previously stored in data storage 502.

The comparison data is sent to a reliability factor module 504 for determination of a reliability factor associated with the network devices and also the reliability of the data received from the devices. In one example, comparison data derived by the comparator 503 may indicate that the first device and the second device share a relationship. This relationship may be, for example, devices in which the corresponding users are acquaintances or each device is on the other device's buddy list or social network. Also, characteristics of the devices may be compared such as a brand or model of each of the devices, vendors associated with each of the devices, locations of each of the devices, etc. A relationship may be determined if the devices are of the same brand/model, from the same vendor, etc.

The reliability factor module 504 may determine that congruent data from multiple devices that share a relationship may have a lower likelihood of reliability. For example, data is received from multiple network devices but a subset of the data from a subset of devices, although similar to each other, is observed to be substantially different from the other devices reporting data. The relationships of the devices, including the subset of device, may be determined by the comparator 503. If the subset of devices is determined to share a relationship (e.g., each of the devices in the subset of devices is on a common buddy list or social network), then it may be determined that the reliability factor of the devices in the subset of devices is unreliable as the risk of collaboration among those devices is high. Hence, the reliability factor module 504 may assign a low reliability factor to the devices in the subset of devices and a higher reliability factor to the other devices in the network.

The reliability factor module 504 sends the reliability factors corresponding to the network devices to the processor 506 which controls the output 505 and/or input 501. Based on the received reliability factors, the processor 506 controls the data output. For example, data from devices with reliability factors that exceed a predetermined value may be output while data from devices with reliability factors that are less than the predetermined value may be blocked. Alternatively, the data from each of the devices may be output with information pertaining to the reliability of each of the devices.

Figure 6:
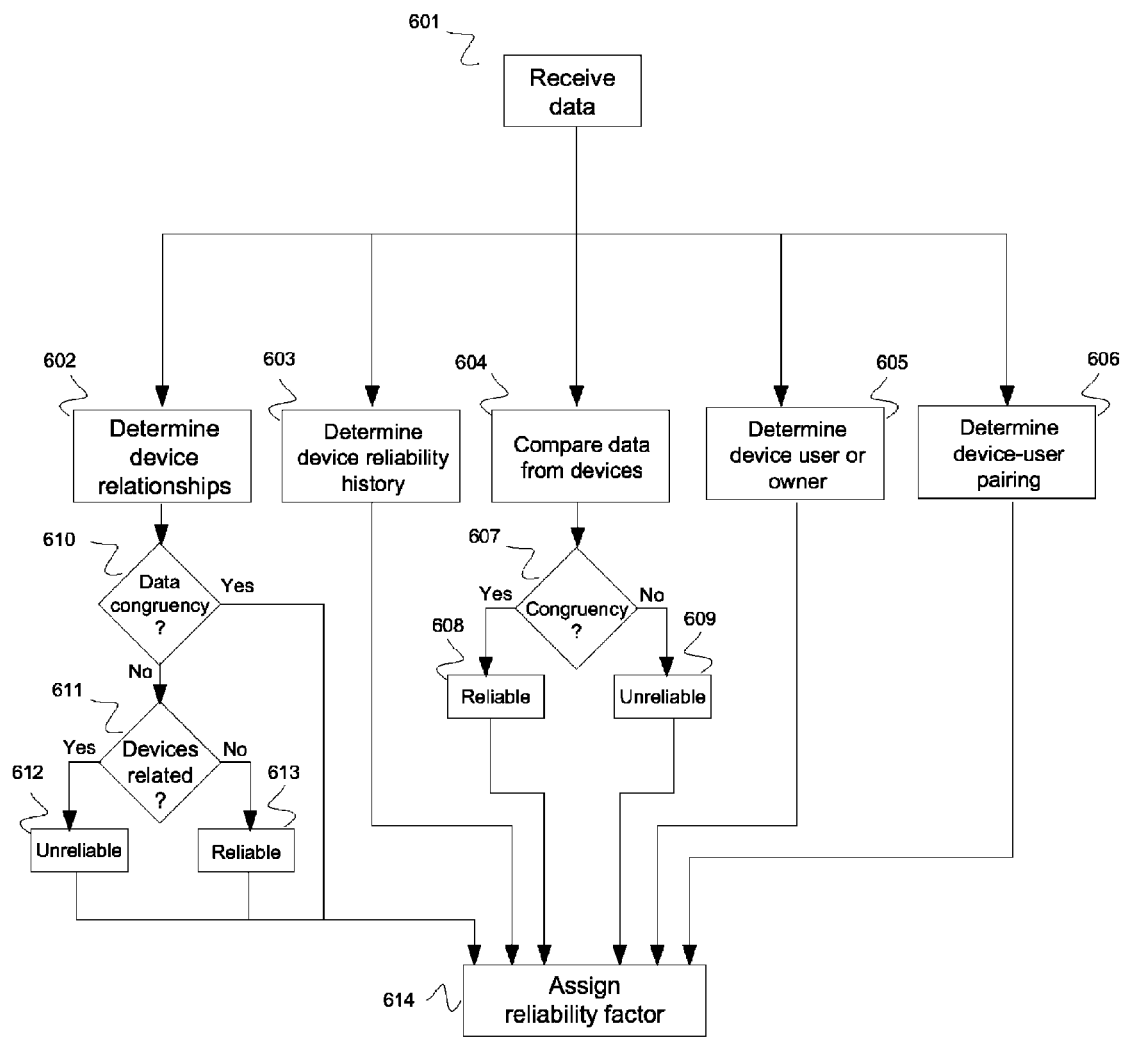
FIG. 6 is a flowchart illustrating examples of determining reliability of received data and/or corresponding data capture devices in a network.

FIG. 6 is a flowchart illustrating examples of determining reliability of received data and/or corresponding data capture devices in a network. In one example, data is received (STEP 601) from devices in a network. For example, image data of a subject matter of interest may be received from multiple devices. The devices providing the image data are examined to determine if a relationship exists between any of the devices (STEP 602). Also, the images received from each of the devices are evaluated to determine congruency (STEP 610). In STEP 610, the data received from each of the devices is evaluated to determine any conflicts in the data from the different devices. For example, if images received from 10 different network devices indicate the presence of a fire at a certain location but images received from two network devices indicate the lack of a fire at the location, then a lack of congruency is identified among the 12 total network devices ("NO" branch of STEP 610). In this case, the devices providing the non-congruent images are further evaluated to determine if a relationship exists between the devices (STEP 611).

Depending on the relationship between the devices providing the non-congruent images, a corresponding reliability factor may be determined for the devices (STEP 614). For example, if a relationship is detected between the devices, then a reliability factor may be assigned to the devices (STEP 614) that is lower than a predetermined level to indicate that the devices and data received from the devices may be less reliable or unreliable (STEP 612). Alternatively, if no relationship is detected between the devices ("NO" branch of STEP 611), then a reliability factor may be assigned to the devices (STEP 614) that is higher than a predetermined level to indicate that the devices and data received from the devices may be reliable (STEP 613).

In this example, the reliability of a data capture device is determined based on congruency of data and relationship with other devices. If multiple devices provide data but also share a relationship, then the data provided by the devices might have a lower level of reliability than data from devices that either have no relationship or only a limited relationship. For example, multiple devices may be the same model of device, same brand of device, same vendor of the device, located within the same general vicinity, etc. Also, the users corresponding to each of the devices may be related such as being on each other's buddy list or social network. If such a relationship is detected, then the devices and/or users corresponding to each of the devices may be less reliable as compared to data from unrelated devices as the risk of collaboration among the devices or the users of the devices increases.

FIG. 7 illustrates an example of device relationships in determining reliability. The table in FIG. 7 may be stored in memory of a service component or a data reliability component. In this example, five devices provide captured data (device A, B, C, D, and E). As FIG. 7 shows, device A is an "Ajax" brand device, model number Imager 2000, located at 57° 15'. Device A was obtained from "Joe's E-Hut" (a retail outlet or dealer) and is related to 3 other Ajax brand devices and 3 Acme brand devices.

Also, device C is also an Ajax brand device which is the same brand device as device A. The model of device C is the Imager 3000 as opposed to the model of device A being the Imager 2000. However, as indicated by the "Related devices" field, the Ajax Imager 3000 and the Ajax Imager 2000 are related devices. Device C is located at approximately the same location as device A and was obtained from the same vendor (i.e., Joe's E-Hut). In addition, the user of device A and the user of device C are on each other's buddy list or social network (i.e., related users). Hence, device A and device C in this example are considered to be related.

Devices B, D, and E are different brands (i.e., Sensit, Aoki, and Panaview, respectively), different models and obtained from different vendors (i.e., Electronic supplies, E-World, and Bert's Cameras, respectively). Also, none of the devices are related to any of the other devices and the users corresponding to each of devices B, D, and E are not related users, nor are the users related to either of the users of device A or C.

In one example, data received from devices A and C may be distinct from data received from devices B, D, and E. For example, Devices B, D, and E may provide image data indicating a drowning victim at a particular location in a particular body of water but devices A and C may provide image data indicating the lack of a drowning victim at the same location in the same body of water. The data reliability component may determine that device A and device C share a relationship in that both of the devices are of the same brand, obtained from the same vendor, and are related devices. Hence, the data reliability component may assign a reliability factor to devices A and C to indicate that devices A and C and the data provided by devices A and C are less reliable. Also, the data reliability component may determine that devices B, D, and E provide congruent data (i.e., a drowning victim is present) but do not share another relationship (i.e., devices B, D, and E are made by different manufacturers, are different models, are obtained from a different vendor and are not related devices). Hence, the data reliability component may assign a reliability factor to each of the devices such that the reliability of devices B, D, and E are indicated as being more reliable than A or C. Also, in another example, each of the devices A, B, C, D, or E may receive information about the reliability of any of the other devices such that any of the devices may be informed of the historical reliability of any of the other devices. During subsequent federation with another device, for example, a device may have stored historical reliability data of the other device and may be informed as to the reliability of the other device.

FIG. 6 also illustrates an alternative method for determining reliability of data and devices. Data may be received from devices in a federated network (STEP 601). The data may be received from a service component which may determine reliability of the data via a data reliability component. Alternatively, the data reliability component may be separate from the service component. In this example, the data reliability component may determine a current reliability factor level based on a reliability history of a device. For example, reliability information pertaining to data received from a particular network device may be stored in memory at the service component or the data reliability component. Over time, multiple reliability factors may be assigned to a device. When data is currently received from the device, the data reliability component may access the memory to determine past historical reliability information pertaining to the device. Based on the past historical reliability information, the data reliability component may determine a current reliability factor to indicate the current reliability of the device.

For example, a network device may capture data and return the captured data to the service component or the data reliability component. The data reliability component may access a local memory to obtain information corresponding to the network device providing the captured data. The information may include historical reliability factors assigned to the device. If the information indicates that the previous historical reliability factors are high, then the data reliability component may assign a high reliability factor to the current data and the device providing the current data. Alternatively, the historical reliability data and/or reputation data of the device may be received from a separate source. The separate source may be a device, for example, in the network or in another federated network. Hence, data pertaining to reliability of a device may be transmitted from a device in a first federated network to a device in a second federated network.

In one example, the historical reliability data is received from another device with which the device shares or brokers reliability information. Information pertaining to a reputation of a device (e.g., historical reliability data based on previous device behavior) may be maintained in any device in the network and shared among any other device in the network. Thus, a first device may contain the reputation data of a second device. The second device may subsequently provide data to a third device that does not contain the reputation data of the second device. However, the third device may receive the reputation data of the second device from the first device and may accordingly assign a corresponding reliability factor. In addition, any information pertaining to the determination of estimated reliability of a device may be shared or brokered among device in a network or may be supplied to a device from an external source.

Hence, in this example, previous reliability of a device and the data provided by the device is used to determine a current reliability factor for the device and/or data provided by the device. In another example, the reliability factor corresponding to the device may increase over time if the historical reliability factor values have been high such that as data from a device is indicated as having high reliability, the reliability of the device may increase with subsequent data submissions.

In another example illustrated in FIG. 6, data received from multiple data capture devices is evaluated for congruency. Reliability of devices may be determined based on the congruency. In this example, data is received from each of the devices in the network (STEP 601) and compared with other data received from the devices (STEP 604). The data reliability component determines if the data received from the devices is congruent (STEP 607). For example, if devices in the network return images of a highway accident but one of the devices returns an image of the lack of the highway accident, then the one device indicating the lack of the accident would be incongruent with the other devices (the "NO" branch of STEP 607). Hence, the one device indicating the lack of the accident, being incongruent with the other device in the network, may be determined to be less reliable or unreliable (STEP 609). The reliability factor may be determined based on the level of reliability of the device (STEP 614). Conversely, if all of the devices return congruent data from the network ("YES" branch of STEP 607), then the devices in the network returning data and the data returned by the devices may be determined to be reliable (STEP 608). For example, a reliability factor may be assigned to the devices reflecting a high reliability (e.g., high value reliability factor) (STEP 614). Also, in the case where the devices are determined to be reliable based on congruency of data returned by the devices, the data reliability component may assign a reliability factor to any of the devices based on the congruency. If all of the devices provide similar data, then the data reliability component may determine that there is an increased likelihood that the data provided by the devices is reliable. A corresponding reliability factor may be assigned to any of the devices reflecting the high likelihood of reliability.

FIG. 6 further illustrates another example of determining reliability of data from a network based on a user or owner of a network device. In this example, data is received from at least one network device (STEP 601). The service component or data reliability component receives the data and determines a user or owner of each of the devices providing data (STEP 605). For example, user or owner information for network devices may be stored in memory at the service component or the data reliability component. In addition, other information pertaining to the device may be stored in memory such as type of device.

When data is received from a network device, the memory is accessed to obtain information on a user, owner, or type associated with the network device. Alternatively, the information may be obtained from a separate source. The identity of the user or owner as well as other information and characteristics of the user or owner or type of device may be compared with the data received from the device or the type of device. For example, data received from a sensing device pertaining to fire reporting may be determined to be reliable if the sensing device is a fire sensing device. In this example, the type of device is compared to the nature of the received data. A match is determined and the device and the information provided by the device is determined to be reliable or to have enhanced reliability. Thus, the data reliability component may determine that the device (i.e., fire sensor in this example) is reliable based on a comparison of the type of data and the type of device. Additionally, the data reliability component may increase the reliability factor of the fire sensor device based on the accurate data received.

Alternatively, the owner or user of the device may be compared with the type of data received to determine likely reliability of the device and/or data received from the device. For example, if the data reliability component determines that the owner and user of the device is a fire chief and the data received include information pertaining to a fire, then the data reliability component may determine and assign a reliability factor based on the owner or user. In this example, the device and data provided by the device (i.e., fire information) may be assigned a reliability factor to indicate reliability of the data because the information is information on fire being provided by a device of a fire chief. Also, information from a trusted source (a fire chief, in this example) may increase the reliability of the trusted source.

FIG. 6 also illustrates a method of determining reliability of network data based on a federation of trust. In this example, data is received from a network device (STEP 601). The data is received, for example, at a data reliability component, that may pair a device with a trusted user (STEP 606). Data pertaining to trusted individuals may be stored in memory at the data reliability component or in a service component and may be accessed for comparison with a user of a device that provides captured data. For example, a network device may capture data and may provide the captured data to the data reliability component. The user of the device may be a trusted individual as identified by data stored in memory. A reliability factor is assigned to the device (STEP 614) reflecting the reliability level of the trusted individual and the corresponding device. Hence, in this example, a device may have increased reliability based on the trusted individual associated with the device as compared to other devices without an association with a trusted individual. In addition, the devices may form trust networks with trusted individuals such that devices in the trust networks are associated with trusted individuals and have increased reliability as reflected by a corresponding reliability factor. Any device may belong to any number of trust networks depending on the association with trusted individuals. For example, a web cam may belong to multiple trust networks which may be indicated by an identifier or trust certificate. The web cam may use the identifier or trust certificate to further identified itself during authentication of the device.

In yet another example, the reliability factor module 504 may also determine reliability factors and estimated reliability of a network device and/or data received from the network device based on a class of the device. For example, network devices may be categorized based on function, reputation, capabilities, etc., and assigned a corresponding class. The class may be used to determine an estimated reliability.

Also, the reliability factor module 504 may determine reliability factors of devices based on low reliability information pertaining to specific devices. For example, the system may store information on devices that may indicate that certain devices are rogue principals. The rogue principals may include devices, users associated with devices, or any other supplier of data. The system may maintain a list of such individuals or devices on a revocation list to disallow or block the individuals or devices from providing information. In one example, the system may receive identification information corresponding to a data-providing device and may compare the identification information to stored information from the revocation list. If a match is detected, the information received from the corresponding device may be blocked such that the recipient does not receive the data from the identified device. Alternatively or additionally, the system may assign a corresponding reliability value to the device or user (e.g., a low reliability factor) to indicate low reliability of the data.

In another example, a computer-readable medium having computer-executable instructions stored thereon is provided in which execution of the computer-executable instructions performs a method as described above. The computer-readable medium may be included in a system or computer and may include, for example, a hard disk, a magnetic disk, an optical disk, a CD-ROM, etc. A computer-readable medium may also include any type of computer-readable storage media that can store data that is accessible by computer such as random access memories (RAMs), read only memories (ROMs), and the like.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. A method for determining reliability of data from a first data source of a plurality of data sources, each data source associated with a corresponding data providing device, the method comprising:
   receiving, at a device configured to determine the reliability of data, the data from the first data source;
   determining the reliability of the received data based on trust information corresponding to the first data source, wherein the step of determining the reliability comprises:
      determining the data received from the first data source of the plurality of data sources is congruent with the data received from a second data source of the plurality of data sources,
      determining a relationship between the first data source and the second data source,
      assigning a reliability factor to the first data source based on the determined the relationship between the first data source and second data source, and
      assigning another reliability factor indicating an increase in reliability to each of the plurality of data sources having data congruent with the first data source.

2. The method of claim 1 wherein the first data source comprises a federated device in a network.

3. The method of claim 2 wherein the federated device is a sensing device in a sensor network.

4. The method of claim 1 wherein the step of assigning a reliability factor includes indicating that the first data source and second data source are unreliable if a relationship is identified between the first and second data source.

5. The method of claim 1 wherein the step of determining a relationship between the first data source and the second data source includes determining that a relationship between the first data source and the second data source exists, and the step of assigning a reliability factor includes identifying the first and second data sources as unreliable.

6. The method of claim 5 wherein the data received from the first data source and the second data source is non-congruent with data received from at least one other data source in the plurality of data sources.

7. The method of claim 1 wherein the step of determining a relationship between the first data source and the second data source includes comparing the first data source and the second data source.

8. The method of claim 7 wherein the comparing includes comparing at least one of a device brand, model, vendor, or location.

9. The method of claim 7 wherein the comparing includes comparing corresponding users of the first and second data sources.

10. The method of claim 1 wherein the step of determining the reliability further comprises:
   identifying a reliability history record of the first data source, the reliability history record including past reliability of the first data source; and
   wherein the assigning the reliability factor is based on the past reliability of the first data source, the reliability factor corresponding to a predicted reliability of the first data source.

11. The method of claim 10 wherein the reliability history record indicates that the first data source is historically reliable, and wherein of reliability factor indicates that the first data source is reliable.

12. The method of claim 1 wherein the step of determining the reliability includes:
   determining a user corresponding to the first data source;
   identifying a data type of the data received from the first data source;
   comparing the data type with the user
   wherein the reliability factor is based on the comparing.

13. The method of claim 12 wherein the step of comparing comprises determining a match between the type of data and the user and wherein the reliability factor indicates that the data source is reliable.

14. A method for determining reliability of data from a first data source of a plurality of data sources, each data source associated with a data providing device, the method comprising:
   receiving, at a device configured to determine reliability of data, the data from the first data source; and
   determining reliability of the received data based on trust information corresponding to the first data source, wherein the step of determining the reliability comprises:
      determining the data received from a first data source in the plurality of data sources is congruent with data of a predetermined number of data sources in the plurality of data sources,
      assigning a reliability factor indicating that the first data source is reliable based on the congruency of data, and
      assigning another reliability factor indicating an increase in reliability to each of the plurality of data sources having data congruent with the first data source.

15. A method for determining reliability of data from a first data source of a plurality of data sources, each data source associated with a data providing device, the method comprising:
   receiving, at a device configured to determine reliability of data, the data from the first data source; and determining reliability of the received data based on trust information corresponding to the first data source wherein the step of determining the reliability includes:
identifying a user associated with the first data source,
identifying a level of trust associated with the first data source based on the association of the first data source with the user,
assigning a reliability factor to the first data source based on the identified level of trust, and assigning another reliability factor indicating an increase in reliability to each of the plurality of data sources having data congruent with the first data source.

16. The method of claim 15 wherein the first data source and the associated user form a trust network.

* * * * *

UNITED STATES PATENT AND TRADEMARK OFFICE
CERTIFICATE OF CORRECTION

| | | |
|---|---|---|
| PATENT NO. | : 7,751,340 B2 | Page 1 of 1 |
| APPLICATION NO. | : 11/556605 | |
| DATED | : July 6, 2010 | |
| INVENTOR(S) | : Scott C. Forbes et al. | |

It is certified that error appears in the above-identified patent and that said Letters Patent is hereby corrected as shown below:

In column 12, line 28, in Claim 11, delete "wherein of" and insert -- wherein the --, therefor.

Signed and Sealed this
Third Day of May, 2011

David J. Kappos
*Director of the United States Patent and Trademark Office*